(12) United States Patent
Wright

(10) Patent No.: US 6,209,488 B1
(45) Date of Patent: Apr. 3, 2001

(54) HAY RING ATTACHMENT

(76) Inventor: Leon Wright, 2125 Hardyville Rd., Munfordville, KY (US) 42765

( * ) Notice: Subject to any disclaimer, the term of this patent is extended or adjusted under 35 U.S.C. 154(b) by 0 days.

(21) Appl. No.: 09/399,872

(22) Filed: Sep. 20, 1999

(51) Int. Cl.[7] ............................. A01K 5/00; A01D 87/00
(52) U.S. Cl. ............................................. 119/60; 414/24.5
(58) Field of Search ....................... 119/58, 60; 414/24.5, 414/490, 920

(56) References Cited

U.S. PATENT DOCUMENTS

| | | | |
|---|---|---|---|
| 3,995,594 | * 12/1976 | Rose | 119/60 |
| 4,302,139 | 11/1981 | Malish | 414/24.5 |
| 4,330,231 | 5/1982 | Brewer | 414/24.5 |
| 5,178,505 | * 1/1993 | Smith | 414/24.5 |
| 5,405,235 | 4/1995 | Samsel, Jr. | 414/490 |
| 5,868,098 | 2/1999 | Adams | 119/60 |
| 6,045,314 | * 4/2000 | Greene | 119/60 |

* cited by examiner

*Primary Examiner*—Charles T. Jordan
*Assistant Examiner*—Elizabeth Shaw
(74) *Attorney, Agent, or Firm*—Charles G. Lamb; David J. Clement; Middleton & Reutlinger

(57) ABSTRACT

A hay ring attachment device includes an enlongated vertically extending member having a top portion, a middle portion, and a lower portion, wherein an upper hay ring receiving assembly is fixedly secured to the top portion. A hay spear receiving assembly is adjustably positioned along the middle portion, and a lower hay ring receiving assembly is adjustably positioned along the lower portion. The hay ring attachment device enables an operator of the type of tractor commonly found on an agricultural farm to utilize a combination of both the three-point hydraulic hitch assembly and the hay spear of the type well known in the art to pick up, move, and lower a hay ring whether or not the hay ring is found to surround a hay bale when the pick-up process is initiated.

4 Claims, 4 Drawing Sheets

HAY RING ATTACHMENT

BACKGROUND OF THE INVENTION

The present invention relates generally to moving hay rings which are used to feed cattle. More particularly, this invention pertains to an apparatus that allows a farm operator to position hay bale rings over hay bales using a tractor with a rear-mounted hydraulic three-point hitch lifting system.

A device which is well-known to the art is a simple hay spear (or "hay fork") which attaches to the rear of a tractor for spearing a bale of hay for use in moving the bale from one place to another. The hay spear is generally attached to a three-point hitch on the tractor and is raised up and down by the tractor operator. Large hay bales are commonly found in the form of rolls between five and six feet in diameter and these rolls can weigh anywhere from one-quarter to nearly three-quarters of a ton.

An additional device well-known to the art is a hay ring in which a bale of hay is placed for feeding cattle. This hay ring generally consists of at least two (2) and usually three (3) or more opposing circular bands with distantly-spaced slats extending between the uppermost and central bands. This configuration enables cattle to put their heads and necks through the openings in the ring in order to feed from the hay bale.

Although there are well-known methods in the art for moving hay bales from one place to another, there are fewer methods known to the art for attachments to hay rings for moving the hay rings with bales of hay from one place to another. For example, U.S. Pat. No. 4,330,231 to Brewer teaches an adapter to be welded to a stock hay ring and further requires the use of a double-arm hay mover, and U.S. Pat. No. 5,868,098 to Adams teaches a hay spear but requires level terrain to hook up, otherwise the hay spear might reach full insertion before the Adams hooks can reach the top ring.

SUMMARY OF THE INVENTION

It is an object of the present invention to provide a hay ring attachment which allows a tractor operator to raise and lower hay rings over previously-positioned round hay bales.

It is a further object of the present invention to provide a hay ring attachment that allows for the transportation of hay rings, whether or not they are positioned around a round hay bale.

It is even another object of the present invention to provide a hay ring attachment that adapts to and is used in conjunction with an existing hay spear.

More particularly, the present invention provides a hay ring attachment detachably mounted to a hay ring. The hay ring attachment includes an enlongated vertically extending member having a top portion, a middle portion, and a lower portion. An upper hay ring receiving assembly is fixedly secured to the top portion and a hay spear receiving assembly is adjustably positioned along the middle portion. A lower hay ring receiving assembly is adjustably positioned along the lower portion.

BRIEF DESCRIPTION OF THE DRAWINGS

A better understanding of the invention will be had upon reference to the following description in conjunction with the accompanying drawings in which like numerals refer to like parts throughout the several views and wherein.

DETAILED DESCRIPTION OF THE PREFERRED EMBODIMENT

Figure 1:
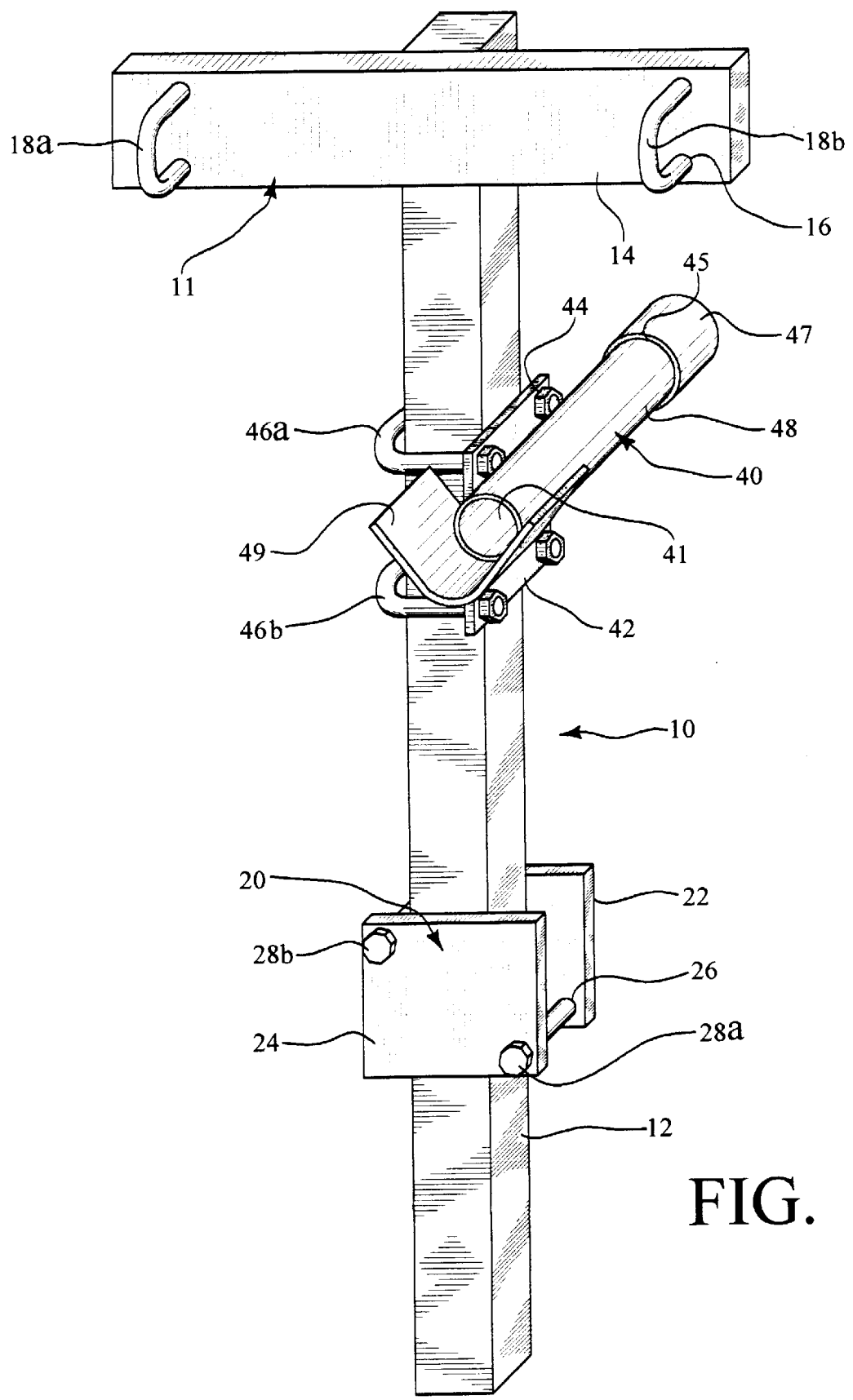
FIG. 1 is a perspective view of one preferred embodiment of the present invention.

FIG. 1 shows a preferred embodiment of the present invention. A hay ring attachment is designated generally by the numeral 10. The hay ring attachment 10 is comprised of an enlongated vertically extending member 12 to the top of which an upper hay ring receiving assembly 11 is fixedly secured. A hay spear receiving assembly 40 is adjustably secured to the middle of the member 12. A lower hay ring receiving assembly 20 is adjustably secured to the bottom of the member 12.

Figure 2:
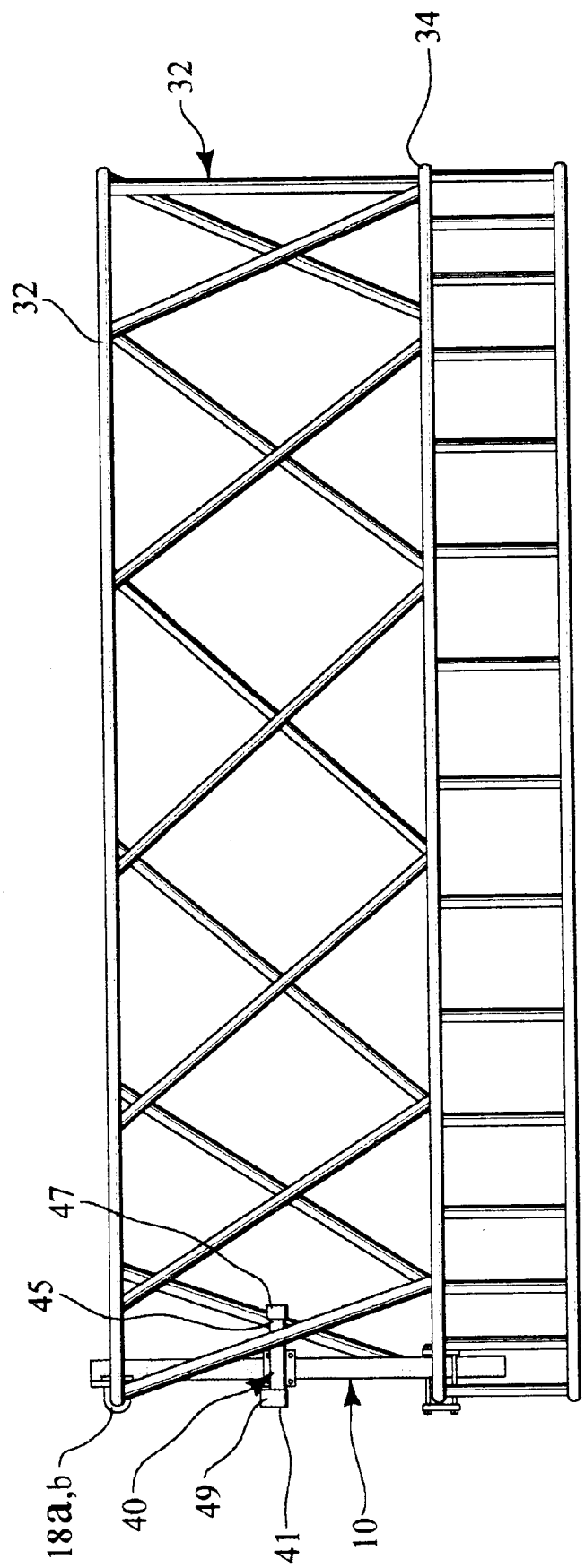
FIG. 2 is a side view of the present invention shown attached to an existing hay ring.

The upper hay ring receiving assembly 11 includes a flat plate 14 which is secured to the upper hay ring receiving assembly 11 by a pair of U-bolts 18a and 18b. Holes 16 are formed at each end of the flat plate 14 through which U-bolts 18a and 18b are inserted. The flat plate 14 is oriented with its flat surface disposed in a horizontal direction. The pair of U-bolts 18a and 18b are passed through the holes 16 in the flat plate 14 and tightened, thereby securing the upper hay ring receiving assembly 11 to an uppermost circular band 32 on a hay ring 30 as shown in FIGS. 2–4.

The hay spear receiving assembly 40 includes a cylinder 48 which is fixedly secured to a flat plate 42. The outer end 41 of the cylinder is formed with a flared opening 49 to more readily guide the hay spear 50 into the assembly 40. The inner end 45 of the cylinder is fitted with a cap 47 which prevents a hay spear 50 from passing through the cylinder and into the center of the hay ring 30. Holes 44 are formed in the flat plate 42 through which U-bolts 46a and 46b are inserted. The hay spear receiving assembly 40 is adjustably secured to the middle of the vertically extending member 12, and in a direction which points the cylinder 48 directly towards the center of the hay ring 30.

The lower hay ring receiving assembly 20 includes flat plates 22 and 24. Holes 26 are formed in the flat plates 22 and 24 through which bolts 28a and 28b are inserted. The flat plates 22 and 24 are secured to the vertical member 12 by means of the bolts 28a and 28b. The bottom of the vertically extending member 12 and a central circular band 34 on the hay ring 30 are sandwiched between the flat plates 22 and 24 by use of the bolts 28a and 28b which are inserted through the holes 26 in the flat plates 22 and 24 and then tightened in order to adjustably secure the lower hay ring receiving assembly 20 to the bottom of the vertically extending member 12 and the central circular band 34 on the hay ring 30.

Figure 3:
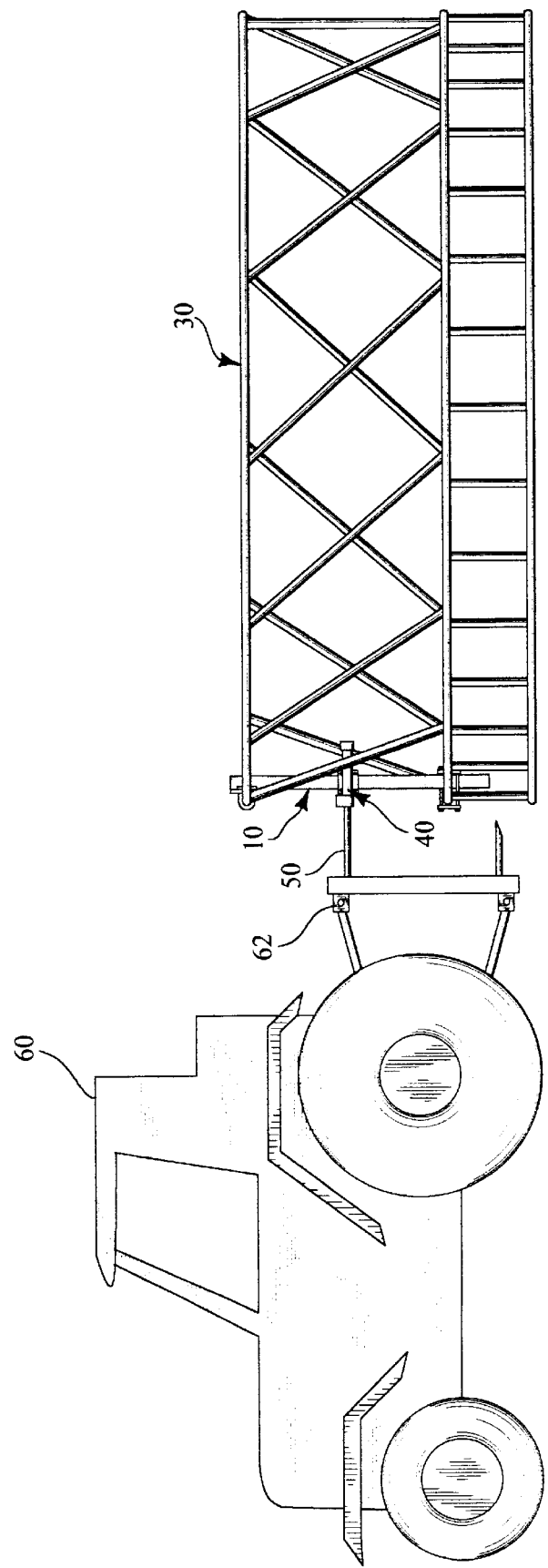
FIG. 3 is a side view of the present invention assembled over an existing hay ring including a hay spear received therein.
Figure 4:
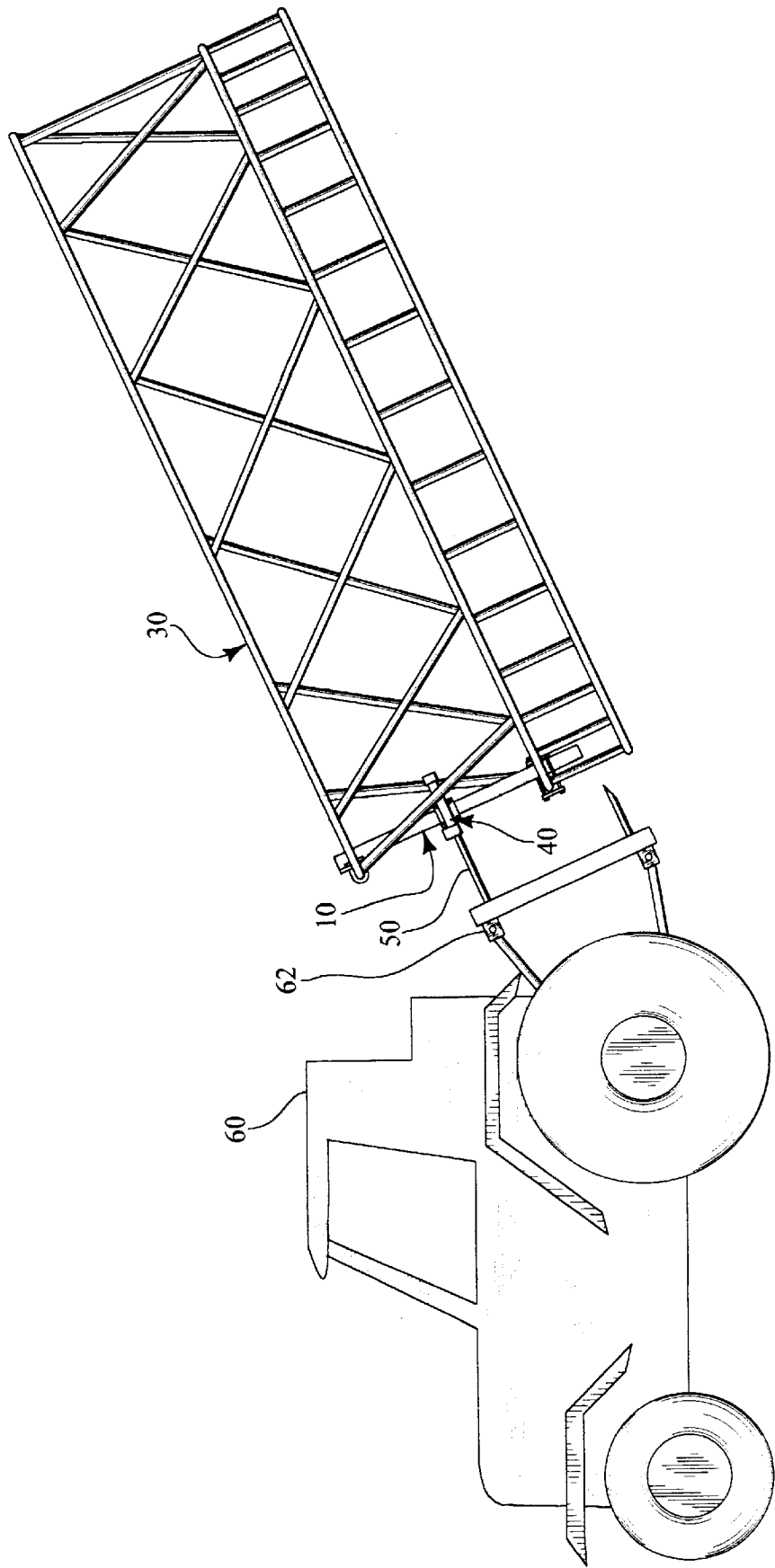
FIG. 4 is a side view of FIG. 3 wherein the present invention is shown in a raised condition.

As shown in FIGS. 3 and 4, the hay ring attachment 10 is mounted onto a tractor 60 by inserting a spear 50 into the hay spear receiving assembly 40, the spear 50 being mounted onto a hydraulic lift 62 by any known means.

In operation, a tractor 60 is provided with a hydraulic lift 62 to which spear 50 is attached. Spear 50 is inserted into cylinder 48 of the hay spear receiving assembly 40 which is attached to the hay ring attachment 10. The cap 47 at the inner end 45 limits such insertion to the depth of the cylinder 48. Upward movement of the spear 50 raises the hay ring attachment 10 as well as the hay ring 30 itself. While in the air, the hay ring 30 is balanced by gravity due to the fact that the mounting point for the horizontally-mounted hay spear receiving assembly 40 is above the center of gravity of the suspended hay ring 30. Once the hay ring 30 is lifted, it can be moved with ease by the tractor and set down over a roll of hay without the need to disengage the tractor 60 from the hay ring 30 in any way until the hay ring 30 is set back on the ground surrounding a new round hay bale. Notably, the tractor operator can drive his tractor to a hay ring 30 which currently surrounds a round hay bale and lift that hay ring 30 up from around the round hay bale. The tractor operator can then transport the hay ring 30 wherever he likes and lower the hay ring 30 onto a fresh round bale of hay.

There are many other notable advantages of the present invention. For example, the present invention works with any hay spear. It works on any round hay ring by sliding the lower hay ring receiving assembly 20 up or down before securing the assembly to a central ring. There is no need to add any extra equipment to the hay spear before moving hay rings. The present invention can be attached to each and every hay ring on the farm, no matter whether those hay rings come as single-piece units, or as segmented parts designed to be joined into a hay ring assembly. Once the present invention is installed and adjusted, there are no moving parts. The present invention can not only be used on the back of a tractor with a hydraulic lift and a three-point hitch, but it can also be used on the front of a tractor with a hydraulic loader and spear. Furthermore, the present invention will operate well with a hay spear that is mounted on the back of a pickup truck. The present invention may also be used with a pull-trailer type of hay moving spike. No parts of the present invention need be removed or stored in off seasons. The only time the present invention is removed is when it is installed on a new hay ring. The vehicle operator can move hay rolls and rings without leaving the vehicle to which the present invention is mounted.

The detailed description is given primarily for clearness of understanding and no unnecessary limitations are to be understood therefrom for modifications will become obvious to those skilled in the art upon reading this disclosure and may be made without departing from the spirit of the invention and scope of the appended claims.

What is claimed is:

1. A hay ring attachment device comprising:

an elongated vertically extending member having a top portion, a middle portion, and a lower portion;

an upper hay ring receiving assembly fixedly secured to said top portion, said hay spear receiving assembly being comprised of a spike receiving cylinder, a flat plate having at least two holes formed therein, and at least one U-bolt, said spike receiving cylinder being fixedly mounted to said flat plate, and said U-bolt being passed through said holes in said flat plate for securing said hay spear receiving assembly to said middle portion of said vertically extending member;

a hay spear receiving assembly adjustably positioned along said middle portion; and, a lower hay ring receiving assembly adjustably positioned along said lower portion.

2. The device of claim 1 wherein said spike receiving cylinder includes a flared end and an opposite end fitted with a cap.

3. A hay ring attachment device comprising:

an elongated vertically extending member having a top portion, a middle portion, and a lower portion;

an upper hay ring receiving assembly fixedly secured to said top portion;

a hay spear receiving assembly adjustably positioned along said middle portion; and, a lower hay ring receiving assembly adjustably positioned along said lower portion wherein said lower hay ring receiving assembly is comprised of at least two flat plates, each of said flat plates having at least two holes formed therein, and at least two bolts; and, said bolts being passed through said holes in said flat plates for securing said lower hay ring assembly to said lower portion of said vertically extending member.

4. The device of claim 3, said bolts of said lower hay ring receiving assembly being passed through said flat plates;

said flat plates bing oriented in such a manner as to be found at the innermost and outermost locations of the combination of said vertically extending member, and a corresponding physically proximate portion of said hay ring; and, said combination being adjustably mounted in a sandwich fashion by said flat plates and said bolts passing through said flat plates.

* * * * *